(12) United States Patent
Mont

(10) Patent No.: US 7,246,379 B2
(45) Date of Patent: Jul. 17, 2007

(54) METHOD AND SYSTEM FOR VALIDATING SOFTWARE CODE

(75) Inventor: Marco Casassa Mont, Gifford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 10/616,519

(22) Filed: Jul. 9, 2003

(65) Prior Publication Data

US 2004/0010700 A1 Jan. 15, 2004

(30) Foreign Application Priority Data

Jul. 10, 2002 (GB) ................. 0215911.9

(51) Int. Cl.
*H04L 9/32* (2006.01)
(52) U.S. Cl. .................... 726/30; 713/165
(58) Field of Classification Search .............. None
See application file for complete search history.

(56) References Cited

U.S. PATENT DOCUMENTS

| | | | | |
|---|---|---|---|---|
| 5,490,216 A | * | 2/1996 | Richardson, III | 705/59 |
| 5,638,446 A | | 6/1997 | Rubin | 380/25 |
| 5,982,892 A | * | 11/1999 | Hicks et al. | 705/51 |
| 6,330,549 B1 | * | 12/2001 | Merkle | 705/51 |
| 6,986,040 B1 | * | 1/2006 | Kramer et al. | 713/155 |

FOREIGN PATENT DOCUMENTS

| | | |
|---|---|---|
| EP | 0 969 366 A1 | 1/2000 |
| EP | 1 267 312 A1 | 12/2002 |
| GB | 2 376 392 A | 12/2002 |
| GB | 2 381 173 | 4/2003 |
| WO | 98/16033 | 4/1998 |
| WO | 01/01629 A1 | 1/2001 |
| WO | 02/077773 A2 | 10/2002 |

OTHER PUBLICATIONS

Boneh, D., et al., "Identity-Based Encryption from the Weil Pairing," (Full Version) pp. 1-31; (Partial Version found in *Advances in Cryptology—CRYPTO 2001*, LNCS vol. 2139, pp. 213-229, Springer-Verlag, 2001).
Boneh, D., et al., "Identity-Based Mediated RSA," 12 pages total.
Cocks, C., "An Identity Based Encryption Scheme Based on Quadratic Residues," *Proceedings of the 8th IMA International Conference on Cryptology and Coding*, LNCS vol. 2260, 4 pages total, Springer-Verlag (2001).
Menezes, A.J., *Handbook on Applied Cryptography*, CRC Press Series on Discrete Mathematices And Its Applications, pp. 1, 397-405 (1997).

* cited by examiner

*Primary Examiner*—Nasser Moazzami
*Assistant Examiner*—Brandon Hoffman

(57) ABSTRACT

A method and system is provided for validating software code provided to a user entity by a software provider. In general terms, the user entity encrypts first data, provides it to the software provider, and receives back an indication that the code is valid only if the software provider has been able to correctly decrypt the encrypted first data, such decryption only being possible using an appropriate decryption key provided by a party with rights in the software code. More particularly, the user entity encrypts the first data using, as encryption parameters, both an encryption key string comprising said software code or a representation thereof, and public data of the aforesaid party. A decryption key appropriate for correctly decrypting the encrypted first data is generated from the encryption key string and provided to the software provider only if the software code provided to the user entity is valid.

26 Claims, 3 Drawing Sheets

METHOD AND SYSTEM FOR VALIDATING SOFTWARE CODE

FIELD OF THE INVENTION

The present invention relates to a method and system for validating software code provided to a user entity by a software provider.

BACKGROUND OF THE INVENTION

As the use of the Internet has increased so, correspondingly has interest in the availability of services over the Internet. In particular it has become commonplace for software distributors to provide web sites where software, for example software plug-ins, freeware software, open-source code, and commercial software can be downloaded.

However, a problem associated with the downloading of software over the Internet is the ability of the downloading party to verify the authenticity of the downloaded software. For example, it is desirable for the down loader to be able to determine whether the downloaded software is in its original form and has not been modified or tampered with and/or whether the software distributor is licensed to provide the software.

A solution to this problem has been the use of digital certificates that are used by the software producers to digitally sign the software; thus allowing the downloading party to verify the integrity of the software by verifying that the digital signature belongs to the appropriate software producer.

However, this solution requires that the downloading party maintain a database of appropriate digital certificates that has to be kept up to date to reflect the latest digital certificates. Further, this solution provides no opportunity for the software producers to obtain visibility as to who is being provided access to their software.

It is desirable to improve this situation.

The present invention is in part based on the appreciation that Identifier-Based Encryption (IBE) has certain properties that can be adapted for use in verifying the authenticity of software code.

Identifer-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it or has it decrypted, using a decryption key computed by the trusted authority 12 based on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained and can be any kind of string, that is, any ordered series of bits whether derived from a character string, a serialized image bit map, a digitized sound signal, or any other data source. The string may be made up of more than one component and may be formed by data already subject to upstream processing. In order to avoid cryptographic attacks based on judicious selection of a key string to reveal information about the encryption process, as part of the encryption process the encryption key sting is passed through a one-way function (typically some sort of hash function) thereby making it impossible to choose a cryptographically-prejudicial encryption key string. In applications where defence against such attacks is not important, it would be possible to omit this processing of the string.

Frequently, the encryption key string serves to "identify" the intended message recipient and this has given rise to the use of the label "identifier-based" or "identity-based" generally for cryptographic methods of the type under discussion. However, depending on the application to which such a cryptographic method is put, the string may serve a different purpose to that of identifying the intended recipient and, indeed, may be an arbitrary string having no other purpose than to form the basis of the cryptographic processes. Accordingly, the use of the term "identifier-based" or "IBE" herein in relation to cryptographic methods and systems is to be understood simply; as implying that the methods and systems are based on the use of a cryptographically unconstrained string whether or not the string serves to identify the intended recipient Generally, in the present specification, the term "encryption key string" or "EKS" is used rather than "identity string" or "identifier string".

A number of IBE algorithms are known and FIG. 2 indicates, for three such algorithms, the following features, namely:

the form of the encryption parameters used, that is, the encryption key string and the public data of the trusted authority (TA);

the conversion process applied to the encryption key string to prevent attacks based on judicious selection of this string;

the primary encryption computation effected;

the form of the encrypted output.

The three prior art IBE algorithms to which FIG. 2 relates are:

Quadratic Residuosity (QR) method as described in the paper: C. Cocks, "An identity based encryption scheme based on quadratic residues", Proceedings of the $8^{th}$ IMA International Conference on Cryptography and Coding LNCS 2260, pp 360-363, Springer-Verlag, 2001. A brief description of this form of IBE is given hereinafter.

Bilinear Mappings p using, for example, a Tate pairing t or Weil pairing ê. Thus, for the Weil pairing:

$$ê: G_1 \times G_1 \rightarrow G_2$$

where $G_1$ and $G_2$ denote two algebraic groups of prime order q and $G_2$ is a subgroup of a multiplicative group of a finite field. The Tate pairing can be similarly expressed though it is possible for it to be of asymmetric form:

$$t: G_1 \times G_0 \rightarrow G_2$$

where $G_0$ is a further algebraic group the elements of which are not restricted to being of order q. Generally, the elements of the groups $G_0$ and $G_1$ are points on an elliptic curve though this is not necessarily the case. A description of this form of IBE method, using Weil pairings is given in the paper: D. Boneh, M. Franklin-"Identity-based Encryption from the Weil Pairing" in *Advances in Cryptology-CRYPTO 2001*, LNCS 2139, pp. 213-229, Springer-Verlag, 2001.

RSA-Based methods The RSA public key cryptographic method is well known and in its basic form is a two-party method in which a first party generates a public/private key pair and a second party uses the first party's public key to encrypt messages for sending to the first party, the latter then using its private key to decrypt the messages. A variant of the basic RSA method, known as "mediated RSA", requires the involvement of a security mediator in order for a message recipient to be able to decrypt an encrypted message. An IBE method based on mediated RSA is described in the paper "Identity based encryption using mediated RSA", D. Boneh, X. Ding and G. Tsudik, 3rd Workshop on Information Security Application, Jeju Island, Korea, August, 2002.

A more detailed description of the QR method is given below with reference to the entities depicted in FIG. 1 and using the same notation as given for this method in FIG. 2. In the QR method, the trusted authority's public data 15 comprises a value N that is a product of two random prime numbers p and q, where the values of p and q are the private data 17 of the trusted authority 12. The values of p and q should ideally be in the range of $2^{511}$ and $2^{512}$ and should both satisfy the equation: p,q≅3 mod 4. However, p and q must not have the same value. Also provided is a hash function # which when applied to a string returns a value in the range 0 to N−1.

Each bit of the user's payload data 13 is then encrypted as follows:

The data provider 10 generates random numbers $t_+$ (where $t_+$ is an integer in the range $[0, 2^N]$) until a value of $t_+$ is found that satisfies the equation jacobi($t_+$,N)=m', where m' has a value of −1 or 1 depending on whether the corresponding bit of the user's data is 0 or 1 respectively (As is well known, the jacobi function is such that where $x^2 \equiv \#modN$ the jacobi (#, N)=−1 if x does not exist, and =1 if x does exist). The data provider 10 then computes the value:

$$s_+ \equiv (t_+ + K/t_+) mod N$$

where: $s_+$ corresponds to the encrypted value of the bit m' concerned, and

K=#(encryption key string)

Since K may be non-square, the data provider additionally generates additional random numbers $t_-$ (integers in the range $[0, 2^N)$) until one is found that satisfies the equation jacobi($t_-$,N)=m'. The data provider 10 then computes the value:

$$s_- \equiv (t_- - K/t_-) mod N$$

as the encrypted value of the bit m concerned.

The encrypted values $s_+$ and $s_-$ for each bit m' of the user's data are then made available to the intended recipient 11, for example via e-mail or by being placed in a electronic public area; the identity of the trusted authority 12 and the encryption key string 14 will generally also be made available in the same way.

The encryption key string 14 is passed to the trusted authority 12 by any suitable means; for example, the recipient 11 may pass it to the trusted authority or some other route is used—indeed, the trusted authority may have initially provided the encryption key string. The trusted authority 12 determines the associated private key B by solving the equation:

$$B^2 \equiv K \, mod N \text{ ("positive" solution)}$$

If a value of B does not exist, then there is a value of B that is satisfied by the equation:

$$B^2 \equiv -K \, mod N \text{ ("negative" solution)}$$

As N is a product of two prime numbers p, q it would be extremely difficult for any one to calculate the decryption key B with only knowledge of the encryption key string and N. However, as the trusted authority 12 has knowledge of p and q (i.e two prime numbers) it is relatively straightforward for the trusted authority 12 to calculate B.

Any change to the encryption key string 14 will result in a decryption key 16 that will not decrypt the payload data 13 correctly. Therefore, the intended recipient 11 cannot alter the encryption key string before supplying it to the trusted authority 12.

The trusted authority 12 sends the decryption key to the data recipient 11 along with an indication of whether this is the "positive" or "negative" solution for B.

If the "positive" solution for the decryption key has been provided, the recipient 11 can now recover each bit m' of the payload data 13 using:

m'=jacobi($s_+$+2B,N)

If the "negative" solution for the decryption key B has been provided, the recipient 11 recovers each bit m' using:

m'=jacobi($s_-$+2B,N)

SUMMARY OF THE INVENTION

In accordance with a first aspect of the present invention there is provided a method of validating software code provided to a user entity by a software provider wherein:

the user entity encrypts first data, provides it to the software provider, and receives back a valid indication that the code is valid only if the software provider has been able to correctly decrypt the encrypted first data, such decryption only being possible using an appropriate decryption key provided by a party with rights in the software code;

the user entity encrypts the first data using, as encryption parameters, both an encryption key string comprising said software code or a representation thereof, and public data of said party;

the said appropriate decryption key is provided by said party to the software provider only if the software code provided to the user entity is valid, generation of this key by the party using both private data related to said public data, and the encryption key string or a corresponding reference string based on a reference version of the software code.

In one embodiment, the party receives the encryption key string via the software provider and uses it to carry out at least one validation check of the software code provided to the user entity. The party also uses the received encryption key string, together with its private data, to generate the aforesaid appropriate decryption key with the proviso that the decryption key is only generated or only provided to the software provider, if the or each validation check is satisfactory. The validation checking can comprise a check on the integrity of the software code and/or a check on the right of the software provider to provide the software code to the user entity.

In another embodiment, the party is arranged to derive a decryption key using the reference string and its private data, whereby this key only serves as the aforesaid appropriate decryption key if the software code provided to the user entity is the same as the reference version.

In accordance with a second aspect of the present invention there is provided a computer system comprising first, second aid third computing entities, wherein:

the first computing entity is arranged to receive software code from the second computing entity and to encrypt a first data set using, as encryption parameters, both an encryption key string comprising a second data set corresponding to the software code provided by the second computing entity or a representation of that code, and public data of a party having rights in the software code; the first computing entity being further arranged to provide the encrypted first data set to the second computing entity whereby to receive back a valid indication that the code is valid only if the second computing entity is able to correctly decrypt the encrypted first data, such decryption only being possible using an appropriate decryption key provided by the third computing entity;

the third computing entity is associated with said party having rights in the software code and is arranged to provide the said appropriate decryption key to the second computing entity only if the software code provided to the first computing entity is valid, the third computing entity being arranged to generate this key using both private data related to said public data, and the encryption key string or a corresponding reference string based on a reference version of the software code.

In accordance with a third aspect of the present invention there is provided a computer system comprising a first computer entity for deriving an encryption key string using a first data set corresponding to software code or a representation of software code provided by a second computer entity and encrypting a second data set with the encryption key string; communication means for providing the encrypted second data set to the second computer entity, wherein a third computer entity associated with a third party having rights in the software code is arranged to provide to the second computer entity a decryption key derived using the first data set to allow decryption of the encrypted second data set.

In accordance with a fourth aspect of the present invention there is provided apparatus comprising:

first means for downloading software code over a network from a software provider, second means for encrypting first data using both public data of a party with rights in the software, and an encryption key string comprising said software code or a representation thereof;

third means for providing the encrypted first data and said encryption key string to the software provider;

fourth means for receiving back third data from the software provider, and fifth means for comparing the third data with the first data, and for generating an indication that the software code is valid if the first and third data match.

The present invention also encompasses a computer program product for use in implementing the foregoing apparatus.

BRIEF DESCRIPTION OF THE DRAWINGS

For a better understanding of the present invention and to understand how the same may be brought into effect reference will now be made, by way of example only, to the accompanying drawings, in which.

BEST MODE OF CARRYING OUT THE INVENTION

Figure 3:
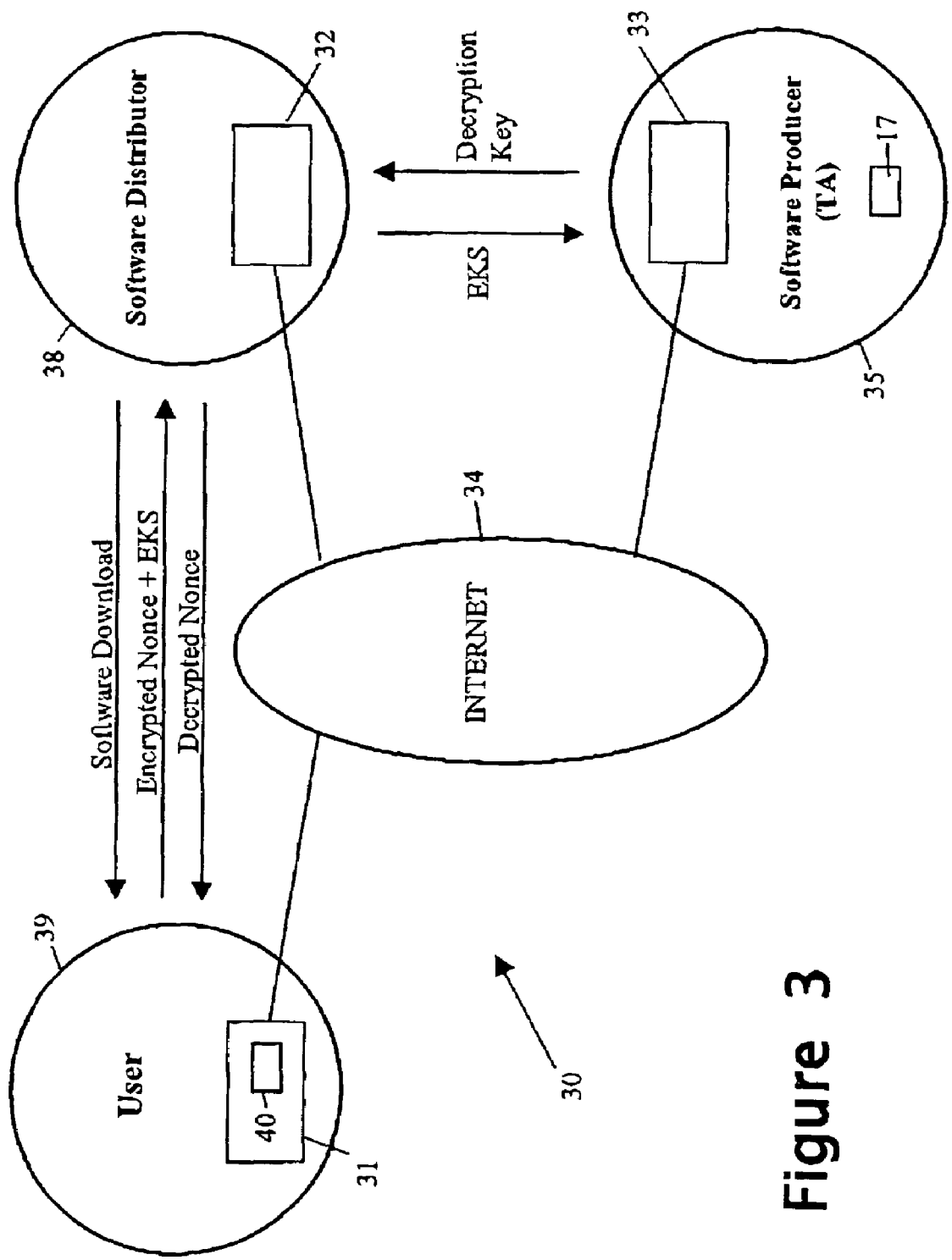
FIG. 3 is a diagram of an embodiment of the present invention.

FIG. 3 illustrates a computer system 30 according to an embodiment of the present invention. Computer system 30 includes a first computing entity 31, a second computing entity 32 and a third computing entity 33. Typically the three computing entities 31, 32, 33 are configured on separate computer platforms, however the computing entities 31, 32, 33 could be configured on a single computer platform. For the purposes of this embodiment, however, the three computing entities 31, 32, 33 are coupled via the Internet 34.

Associated with the third computing entity 33 is a software producer 35 that is configured to act as a trusted authority. The software producer 35 creates and generates software for distribution to potential users.

Associated with the second computing entity 12 is a software distributor 18 that is arranged to distribute, via a web site (not shown), software produced by the software producer 15; however, as will be appreciated by a person skilled in the art the software could be distributed in a variety of ways, for example via email.

The first computing entity 31 is configured to allow a user 39 to download software from the second computing entity 32 via the latter's website (not shown).

Figure 1:
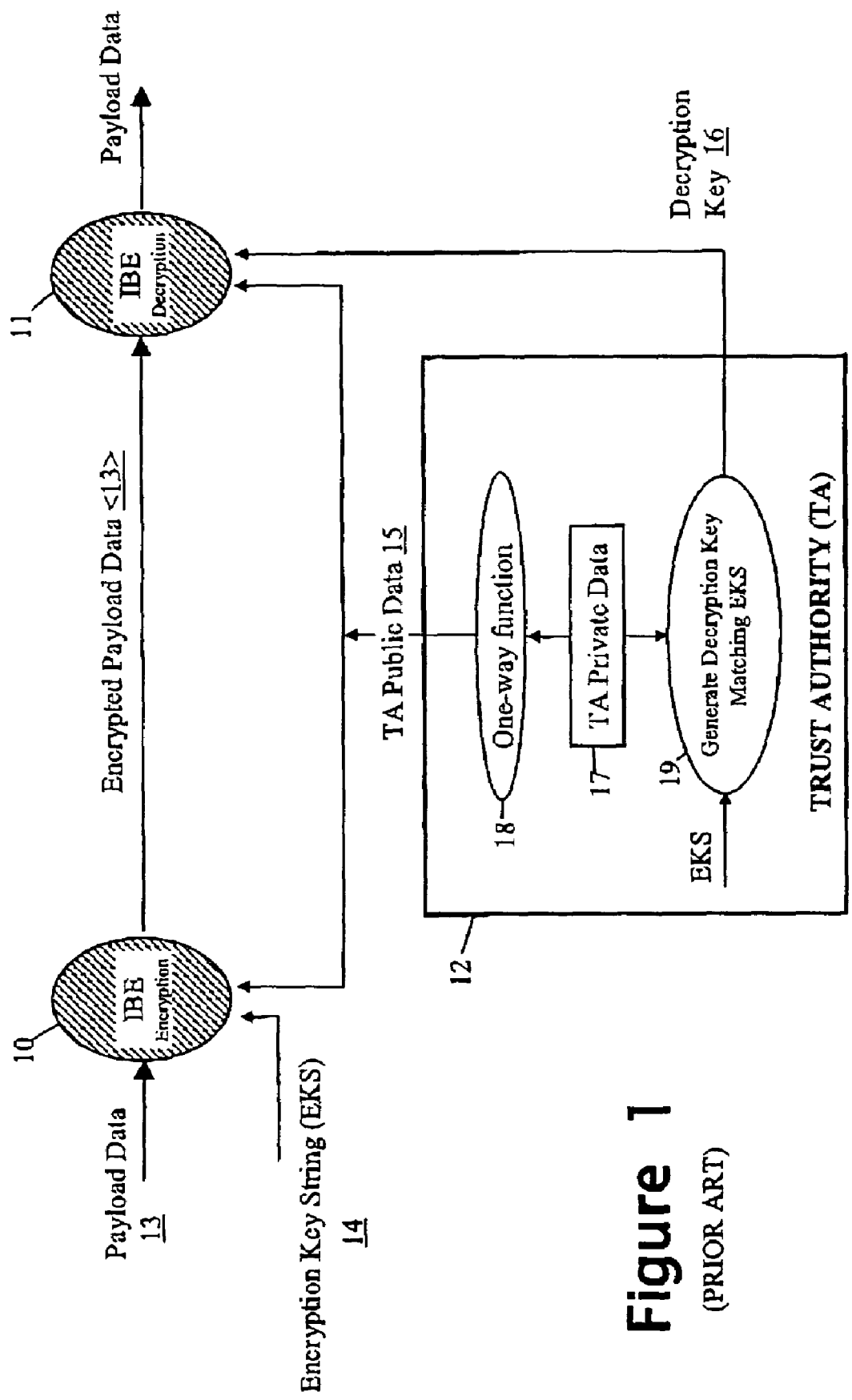
FIG. 1 is a diagram illustrating the operation of a prior art encryption schema known as Identifier-Based Encryption.
Figure 2:
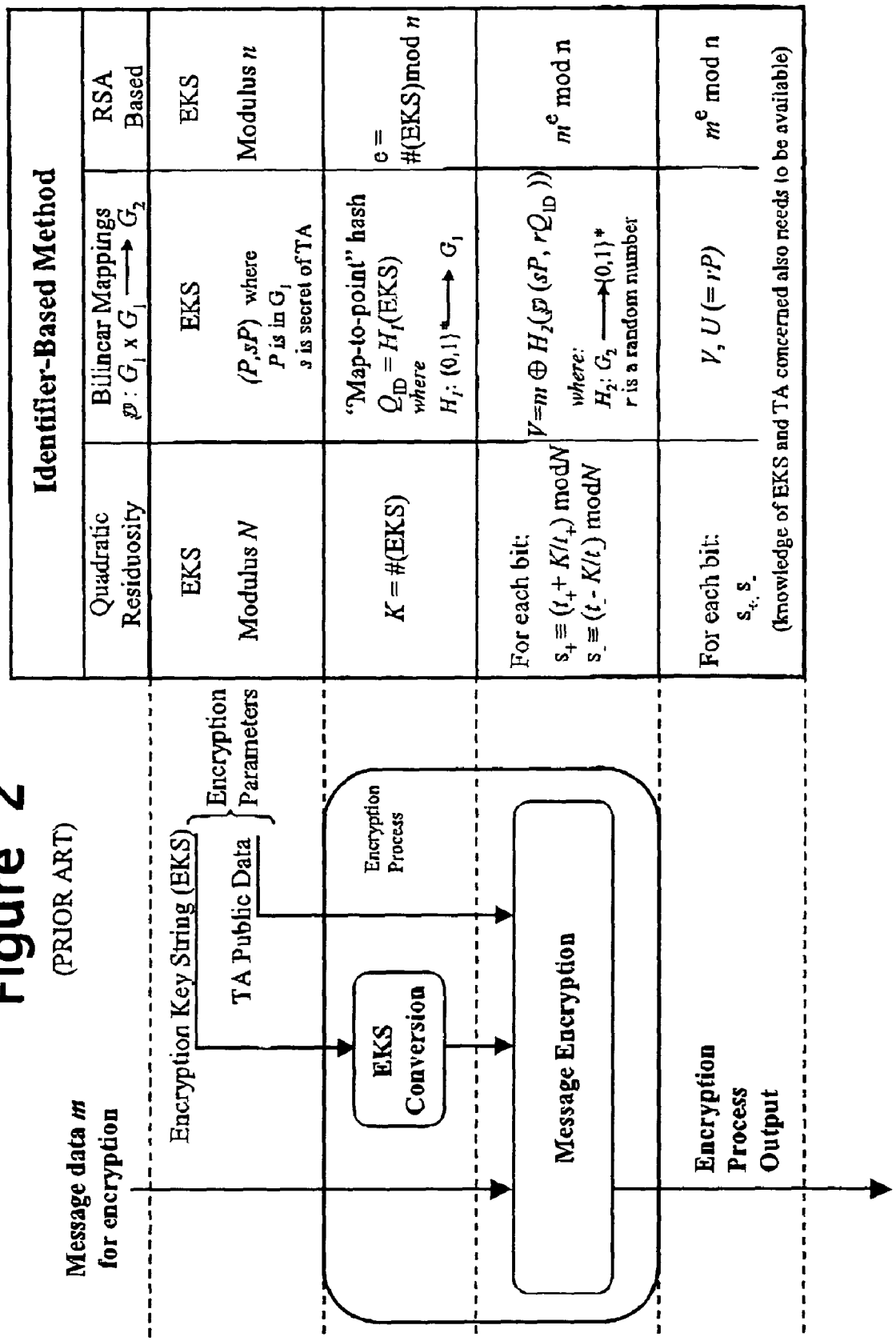
FIG. 2 is a diagram illustrating how certain IBE operations are implemented by three different prior art IBE methods.

To allow the user 19 to verify the authenticity of software available for downloading from the software distributor's web site (e.g. to determine whether the software has been modified or tampered with and/or whether the software distributor 18 has a licence to distribute the software), the system employs an Identifier-Based Encryption method with the computing entities 31, 32 and 33 having the roles of the data provider 10, data recipient 11 and trusted authority 12 of the FIG. 1 IBE arrangement. In the following description of the FIG. 3 embodiment, it will be assumed that the IBE algorithm being used is the QR algorithm described above with respect to FIG. 1.

More particularly, the software producer 35, acting as a trusted authority, uses it private data p and q to generate a value of N which it makes publicly available, along with an indication of the hash function #, as public data 37. As will be appreciated by a person skilled in the art the public data 37 can be made available in a variety of ways, for example via a public web site (not shown). The software provider 35 is also arranged to generate a QR decryption key from a given encryption key string and its private data.

The user 19 is provided with QR encryption software; this software is, for example, a software plug-in 40 obtained from the software producer's web site (not shown) and installed within the customer's web browser (not shown). Preferably, the plug-in 40 embeds knowledge regarding the software producer's public data 37.

Similarly, the software distributor is provided with QR decryption software obtained from the software provider 35 or from any other suitable source.

To verify the authenticity of software downloaded from the software distributor 38, the user 39, on downloading the software, derives from the software representation of the software (e.g. a hash of the software) a representative digital string of data bits (this string could be the complete software code). This string forms the encryption key string (EKS) of the FIG. 1 IBE arrangement. This string is then used, together with the public data of the software producer 35, to encrypt a nonce (i.e. a random number) selected by the user 19; the details of the QR encryption process have already been given above and will not be repeated here. The payload data that is encrypted can be data other than a nonce.

The encrypted nonce and the encryption key string are provided to the software distributor 38 by any suitable means, for example via e-mail or by being placed in a electronic public area.

When providing the encrypted nonce and the corresponding EKS, the user 39 challenges the software distributor 38 to decrypt and return the nonce. In order to do this, the software distributor 38 must obtain a decryption key from the software producer 35 for which purpose the software distributor 18 provides the encryption key string EKS to the software producer 15. Since the EKS is a version of software or representation of software downloaded by the user 39, the provision of the EKS to the software producer gives the latter the opportunity to check the validity of that software. This checking can comprise, for example, a check on the integrity of the software relative to a reference version held by the software producer 35, and/or a check that the software distributor 38 currently has the right to provide the software to the user 39. Only if the software producer 35 is satisfied with the checks it has conducted, does it generate the QR decryption key B from the provided EKS, and provide this decryption key back to the software distributor 38. Of course, the software producer 35 can generate the decryption key in parallel with, or even before, carrying out its checks provided it delays making the decryption key available to the software distributor until it is satisfied that the checks have been passed.

If the software producer 38 makes available the decryption key to the software distributor 38, then provided the EKS that the software distributor 38 passed to the software producer 35 was the same as that used by the user 39 to encrypt the nonce, the decryption key will enable the software distributor 38 to decrypt the nonce and return it to the user 39, thereby re-assuring the latter that the software producer 35 is satisfied with the software that the user has downloaded. However, if the software distributor 38, knowing that the EKS used by the user 39 will not be accepted by the software producer 35, seeks to fool the producer 35 by substituting an acceptable EKS, then the decryption key returned by the software producer 35 will be unfit to correctly decryption the nonce as the decryption key was not formed from the EKS used to encrypt the nonce.

Thus, the user 39 will be alerted to the existence of a problem with the downloaded software by the failure of the software distributor 38 to return the decrypted nonce either because the software producer 35 refused to provide the appropriate decryption key or because the key returned was based on a false EKS.

It will be appreciated that many variants are possible to the above-described embodiment of the invention. For example, if the software producer 35 is informed by the software distributor 38 of the identity of the software in respect of which the user 39 has issued its challenge, the software producer 35 need not be provided with the EKS used by the user 39, instead, the software producer 35 can simply generate a decryption key for the software concerned using a reference key string based on a reference version of the software (generation of the reference key string, and indeed of the decryption key, can be done in advance). Only if the EKS used by the user 39 is based on software corresponding to the reference copy, will the decryption key be effective to correctly decrypt the encrypted nonce provided the user 39.

Further, the EKS derived from the software could be made dependent on dynamic information, for example time and/or a random number. In this case the verification of the software (i.e. the generation of the decryption key by the software producer 35 in response to provision of the EKS by the software distributor 38) must be done every time the user 39 wishes to verify the software issued by the software distributor 38. Since this directly involves the software producer 35 in the challenge loop, this allows the software producer 35 to accumulate evidence about misbehaviour both of certified and fake software distributors.

Where the software producer 35 is arranged to derive the decryption key using a reference key string based on a reference version of the software, then the software producer 35 will need to be provided with the dynamic information used in the EKS; typically the software distributor 38 will be arranged to pass on this dynamic information to the software producer. The software producer 35 can then form the reference key string using the dynamic information and the reference version of the software code or a representation thereof.

The use of dynamic information prevents certain misuses of the schema and prevents the use of inaccurate information that was valid at the time of initial certification from being used fraudulently (e.g. prevents a software distributor from continuing to distribute software once a licence has expired).

As already indicated, the data encrypted by the user 39 need not be a nonce and could, for example, be an instruction; in this case, the software distributor can, of course, only follow the instruction if able to correctly decrypt it. The instruction might simply be for the software distributor to provide an answer to a specified question.

The original challenge from the user 39 can be arranged to occur automatically, for example, the first time the software concerned is executed by the user.

It may be noted that the software producer 35 could have multiple public datas 37. For example each "public data" could be associated to a particular class of consumers. A consumer could be aware just of a subset of these public datas. This could allow the software producer 35 to gather detailed information about categories of users of its service.

Whilst in the FIG. 3 embodiment the role of trusted authority is taken by the software producer, this role could be taken by a different party having rights in the software code such as a licensor of technology implemented by the software code. Similarly the party providing the software to the user need not be a software distributor as such, merely a party involved in the provision of the software to the user.

The communication between the various parties can make use of standard protocols such as HTTP and SOAP. Further, where required secure connections can be established using secure protocols such as SSL.

It will be appreciated that instead of the QR IBE method, the above-described embodiment can be implemented using any other suitable IBE algorithm, such as those mentioned above that use of Weil or Tate pairings, or are RSA based.

The invention claimed is:

1. A method of validating software code provided to a user entity by a software provider, wherein:

the user entity encrypts first data, provides it to the software provider, and receives back a valid indication that the code is valid only if the software provider has been able to correctly decrypt the encrypted first data, such decryption only being possible using an appropriate decryption key provided by a party with rights in the software code;

the encryption of the first data by the user entity is effected using, as encryption parameters, both an encryption key string comprising said software code or a representation thereof and public data of said party;

the said appropriate decryption key is provided by said party to the software provider only if the software code provided to the user entity is valid, generation of this key by the party using both private data related to said public data, and the encryption key string or a corresponding reference string based on a reference version of the software code.

2. A method according to claim 1, wherein the first data is a nonce.

3. A method according to claim 1, wherein said valid indication that the code is valid is said first data correctly decrypted from the encrypted first data.

4. A method according to claim 1, wherein said party receives the encryption key via the software provider and uses it to carry out at least one validation check of the software code provided to the user entity; the party also using the received encryption key string, together with said private data, to generate the said appropriate decryption key with the proviso that the decryption key is only generated or only provided the software provider, provided the or each validation check is satisfactory.

5. A method according to claim 4, wherein said at least one validation check comprises at least one of:
    a check on the integrity of the software code;
    a check on the right of the software provider to provide the software code to the user entity.

6. A method according to claim 4, wherein the encryption key string further comprises second data.

7. A method according to claim 6, wherein the second data is a random number.

8. A method according to claim 1, wherein said party is arranged to derive a decryption key using said reference string and said private data, whereby this key only serves as said appropriate decryption key if the software code provided to the user entity is the same as said reference version.

9. A method according to claim 8, wherein the encryption key string further comprises second data, the second data being provided to said party which uses it, together with the reference version of the software code or a representation thereof, to generate the decryption key.

10. A method according to claim 9, wherein the second data is a random number.

11. A computer system comprising first, second and third computing entities, wherein:
    the first computing entity is arranged to receive software code from the second computing entity and to encrypt a first data set using, as encryption parameters, both an encryption key string comprising a second data set corresponding to the software code provided by the second computing entity or a representation of that code, and public data of a party having rights in the software code; the first computing entity being further arranged to provide the encrypted first data set to the second computing entity whereby to receive back a valid indication that the code is valid only if the second computing entity is able to correctly decrypt the encrypted first data, such decryption only being possible using an appropriate decryption key provided by the third computing entity;

the third computing entity is associated with said party having rights in the software code and is arranged to provide the said appropriate decryption key to the second computing entity only if the software code provided to the first computing entity is valid, the third computing entity being arranged to generate this key using both private data related to said public data, and the encryption key string or a corresponding reference string based on a reference version of the software code.

12. A computer system according to claim 11, wherein the first data set is a nonce.

13. A computer system according to claim 11, wherein the second computing entity is arranged to operate a web site and to provide said software code via the web site.

14. A computer system according to claim 11, wherein said party is the software producer.

15. A computer system according to claim 11, wherein the encryption key string further comprises a third data set.

16. A computer system according to claim 15, wherein the third data set is a random number.

17. A computer system according to claim 15, wherein the third computing entity is arranged to derive a decryption key using said reference string and said private data whereby this key only serves as said appropriate decryption key if the software code provided to the first computing entity is the same as said reference version, the third computing entity being arranged to receive the third data set from the second computing entity and to form said reference string using the received third data set and the reference version of the software code or a representation thereof.

18. A computer system according to claim 11, wherein the third computing entity is arranged to receive said encryption key string via the second computing entity and to use it to carry out validation of the software code provided to the first computing entity, the third computing entity being arranged to derive the decryption key using said encryption key string and/or to provide the decryption key to the second computing entity, only after satisfactory validation of the software code whereby the decryption key, if provided to the second computing entity, is said appropriate decryption key.

19. A computer system according to claim 18, wherein the third computing entity is arranged to carry out validation of the software code by checking at least one of:
    the integrity of the software code;
    the right of the second computing entity to provide the software code to the first computing entity.

20. A computer system comprising a first computer entity for deriving an encryption key string using a first data set corresponding to software code or a representation of software code provided by a second computer entity and encrypting a second data set with the encryption key string; communication means for providing the encrypted second data set to the second computer entity, wherein a third computer entity associated with a third party having rights in the software code is arranged to provide to the second computer entity a decryption key derived using the first data set to allow decryption of the encrypted second data set.

21. A computer system according to claim 20, wherein the communication means provides the encryption key string to the third computer entity to allow validation of the first data set.

22. A computer system according to claim 21, wherein the third computer entity provides the decryption key to the second computer entity on validation of the first data set.

23. Apparatus comprising:
first means for downloading software code over a network from a software provider,
second means for encrypting first data using both public data of a party with rights in the software, and an encryption key string comprising said software code or a representation thereof;
third means for providing the encrypted first data and said encryption key string to the software provider;
fourth means for receiving back third data from the software provider, and
fifth means for comparing the third data with the first data, and for generating an indication that the software code is valid if the first and third data match.

24. Apparatus according to claim 23, wherein the first data is a nonce.

25. Apparatus according to claim 23, wherein the encryption key string further comprises at least one of a random number and a time indication.

26. A computer program product arranged to condition computing apparatus, when installed thereon, to provide:
means for encrypting first data using both an encryption key string comprising software code downloaded by the apparatus from a software provider or a representation of that code, and public data of a party with rights in the software code;
means for providing the encrypted first data and said encryption key string to the software provider;
means for receiving back third data from the software provider, and
means for comparing the third data with the first data, and for generating an indication that the software code is valid if the first and third data match.

* * * * *